United States Patent Office 3,342,878
Patented Sept. 19, 1967

3,342,878
PREPARATION OF MONOHYDROXYMETHYLCY-CLODODECANE BY HYDROFORMYLATION OF CYCLODODECATRIENES
Clau Berther, Chur, Richard Sailer, Domat, Ems, and Johann Giesen, Haldenstein, Switzerland, assignors to Inventa A.G. für Forschung und Patentverwertung, Zurich, Switzerland
No Drawing. Filed Jan. 14, 1963, Ser. No. 251,000
Claims priority, application Switzerland, Jan. 18, 1962, 595/62
3 Claims. (Cl. 260—617)

The invention relates to a process for the production of hydroxymethylcyclododecane and, more particularly, to such a process whereby a preponderant amount of the end product is obtained by hydroformylation of cyclic trienes.

Hydroxymethylcyclododecane is an important product for the manufacture of cyclododecanoic acid from which laurolactam is manufactured.

It is known that carbonyl and hydroxymethyl compounds can be produced from aliphatic and cyclic olefins by means of the oxo synthesis. Thus, substances containing two or more conjugated double bonds form monofunctional compounds. When the double bonds are in isolated position, mixtures of monofunctional and, primarily, di- and polyfunctional derivatives are obtained. According to French Patent 889,023, it is feasible to produce, from 4,4'-dicyclohexenyl methane, the corresponding dialcohol by hydroformylation, and, analogously, from 1,1'-dicyclohexene the 1-hydroxymethyldicyclohexane (see Kurt Schuster, Fortschritte der chemischen Forschung, 2 (2), 365 (1961)).

From 1,5-dimethylhexadiene, dimethyloctanediol forms by the oxo synthesis aside from little $C_9$ alcohol (FIAT Report No. 1,000). Cyclooctatetraene, having conjugated double bonds, is readily reacted to the hydroxymethyl compound.

Cyclododecatriene which, according to the comonly used synthesis method from butadiene, is obtained as a mixture of isomers of trans, trans, trans, trans, trans, cis forms and, due to the size of its ring, has particular chemical characteristics and properties so that, according to German Patent 1,059,904, it surprisingly had been found that it can be hydroformylated, like cyclic olefins with several isolated double bonds. Mixtures of mono-, di- and trihydroxymethylcyclododecane form thereby. For instance, according to that process, the cyclododecatriene is treated in hexane with a cobalt catalyst at 130–150° C. and with a gas mixture of 130 atmospheres CO and 110 atmospheres hydrogen. This, after at short posthydrogenation, yields 36 percent mono-, 45 percent di- and 19 percent trihydroxymethylcyclododecane. This clearly shows that the polyfunctional reaction products prevail. Hence, the oxo synthesis of the cyclododecatriene surprisingly appears to follow the rule of the isolated and conjugated double bonds.

It now has been found that, contrary to all expectations, the hydroformylation of this cyclic triene can be carried out in such a manner that predominantly monohydroxymethylcyclododecane forms.

The process according to the invention for the production of a mixture of cyclododecane derivatives containing principally monohydroxymethylcyclododecane by reaction of cyclodocatriene with CO and hydrogen in the presence of catalysts commonly employed in the oxo synthesis (such as cobalt salts, especially cobalt acetate or cobalt naphthenate), if desired, in the presence of solvents, and ensuing posthydrogenation of the reaction mixture, is characterized by the features that the molar proportions of carbon monoxide to hydrogen is held at 1:1, and that, if solvents are employed, these solvents are aliphatic alcohols.

Preferably, the reaction is carried out in alcoholic solution at concentrations of 50 and more percent by weight, calculated on the triene used. It has been established that especially favorable results are obtained when as solvents ethanol, butanol or ethyl acetate are used. However, it is feasible to work in the absence of a solvent or even to use other solvents, and still to obtain the monofunctional compound as the major component in the reaction mixture. As catalysts the commonly used cobalt salts are used in amounts of 3 to 10 mol percent, calculated on the triene used. Very good results are obtained, e.g., with cobalt acetate or cobalt naphthenate. The latter is particularly suited for continuous processes.

Essential for the course of the reaction, i.e., for the yield of monohydroxymethylcyclododecane, is the proportion of CO to hydrogen. It is to be chosen so that hydrogen always is present in excess over the CO. The optimum molar proportion of carbon monoxide to hydrogen is 1:2.5.

It is a known fact that in the oxo synthesis, depending upon the reaction conditions and quantities of gases employed, the corresponding aldehydes form beside the alcohols. A separation of these mixtures is difficult so that it is advisable to expand the mixture and then to carry out a posthydrogenation with hydrogen. This procedure not only exhibits the above-named advantage but also effects a decomposition of the cobalt carbonyl formed during the reaction and a recovery of the catalyst in readily filterable form after the termination of the reaction.

The most favorable reaction temperatures are 100 to 200° C. and preferably 120 to 150° C.

The reaction can be carried out batchwise or also in continuous production. In batch operations, the CO-hydrogen mixture is compressed to 100 to 175 atmospheres and allowed to react for 2 to 5 hours. After the pressure has decreased to a constant value, the pressure again is restored to its former level and again allowed to react for the same amount of time. The mixture then is allowed to cool and is expanded, the catalyst filtered, and the reaction mixture distilled in vacuo. Aside from small quantities of cyclododecane, more than 80 percent monohydroxymethylcyclododecane, 10 to 15 percent dihydroxymethylcyclododecane and a very small amount of nondistillable residue are obtained. The progress of the reaction can easily be controlled by taking samples from time to time and analyzing the same gas chromatographically.

The process, of course, may also be carried out continuously in a pressure tube. For this purpose two high pressure devices are required, one for the hydroformylation, the other for the posthydrogenation.

The invention now will be further illustrated by the following examples. However, it should be understood that these are given merely by way of explanation, not of limitation, and that numerous changes may be made in the details without departing from the spirit and the scope of the invention as hereinafter claimed.

*Example 1*

405 grams 1,5,9-cyclododecatriene, 400 ml. ethanol and 16.6 g. cobalt in form of the acetate were entered in an autoclave of 2,500 ml. capacity. 175 atmospheres of a carbon monoxide-hydrogen mixture of molar proportions of 1:2.5 were pressed in, and the temperature raised to 130° C. At this temperature, the pressure decreased after 90 minutes to 60 atmospheres. 175 atmospheres of the gas mixture again were pressed in, and the reaction allowed to proceed for 3 hours. When no further decrease in the pressure could be observed, the mixture was cooled to approximately 40° C., and the remaining gases allowed to escape. In order to decompose the cobalt carbonyl present, 100 atmospheres hydrogen were pressed in and the temperature raised to 150° C. until the pressure remained constant. The autoclave then was cooled, expanded and emptied. The cobalt formed was filtered and the solvent distilled. The residue thus remaining was vacuum-distilled. Thereby, in the forerun or first run, 4.7 g. cyclododecane distilled. The main fraction distilled at 90–94° C. at 0.1 mm. Hg and yielded 430 g. monohydroxymethylcyclododecane (84 percent). The last run or tailings, boiling at 140–145° C. at 0.1 mm. Hg, contained 51 g. dihydroxymethylcyclododecane, and 26 g. residue remained in the still.

*Example 2*

The reaction was carried out as described in Example 1, except that 400 ml. n-butanol were used as the solvent. The vacuum distillation led to the following result:

First run: 4 g. (0.8%) cyclododecane
Main fraction: 425 g. (83.8%) monohydroxymethylcyclododecane
Last run: 61 g. (12%) dihydroxymethylcyclododecane
Residue: 17 g. (3.4%)

*Example 3*

The reaction was carried out as in Example 1, but without solvent. The distillation of the end product in vacuo gave the following result:

First run: 5 g. (1%) cyclododecane
Main fraction: 284 g. (54%) monohydroxymethylcyclododecane
Last run: 103 g. (19.7%) dihydroxymethylcyclododecane
Residue: 133 g. (25.3%)

We claim as our invention:

1. A process for the production of cyclododecane derivatives containing predominantly monohydroxymethylcyclododecane from cyclododecatriene by the reaction with carbon monoxide and hydrogen in the presence of cobalt catalysts, which comprises reacting said cyclododecatrienes in an at least 50 percent solution in a substance selected from the group consisting of ethanol and butanol, at a pressure ranging from 100 to 175 atmospheres and at temperatures of 100 to 200° C., holding the molar ratio of carbon monoxide to hydrogen to 1:2.5, posthydrogenating the reaction mixture thus obtained with hydrogen to decompose cobalt carbonyl formed during the reaction, removing cobalt and solvent, and recovering the monohydroxymethylcyclododecane by vacuum distillation.

2. A process for the production of monohydroxymethylcyclododecane, which comprises reacting cyclododecatriene in an at least 50 percent solution in a substance selected from the group consisting of ethanol and butanol with carbon monoxide and hydrogen, in a molar ratio of 1:2.5, at a pressure ranging from 100 to 175 atmospheres and at temperatures of 100 to 200° C. for 2 to 5 hours in the presence of a cobalt catalyst, posthydrogenating the reaction mixture with hydrogen to decompose cobalt carbonyl formed during the reaction, removing cobalt and solvent, and distilling the reaction mixture in vacuo thereby obtaining predominantly monohydroxymethylcyclododecane, aside from minor quantities of cyclododecane and dihydroxymethylcyclododecane.

3. A process for the production of monohydroxymethylcyclododecane, which comprises reacting cyclododecatriene in an at least 50 percent solution in a substance selected from the group consisting of ethanol and butanol with carbon monoxide and hydrogen in a molar ratio of substantially 1:2.5, at a pressure of 100 to 175 atmospheres and at temperatures of 100 to 200° C. for 2 to 5 hours in the presence of a catalyst selected from the group consisting of cobalt acetate and cobalt naphthenate, at a proportion of 3 to 10 percent cobalt calculated on the cyclododecatriene, posthydrogenating the reaction mixture with hydrogen at a pressure of substantially 100 atmospheres and at a temperature of substantially 150° C. to decompose the cobalt carbonyl formed during the reaction, removing cobalt and solvent from the reaction mixture, and distilling the latter in a vacuum of substantially 0.1 mm. Hg, thereby obtaining predominantly monohydroxymethylcyclododecane.

References Cited

UNITED STATES PATENTS 3,089,904   5/1963   Lippincotte et al. _____ 260—617

FOREIGN PATENTS 861,979   3/1961   Great Britain.

OTHER REFERENCES

Enjay Co., "Higher Oxo Alcohols," 1957, p. 19. (Copy in Group 130.)

LEON ZITVER, *Primary Examiner.*

M. B. ROBERTO, T. G. DILLAHUNTY,
*Assistant Examiners.*